United States Patent Office.

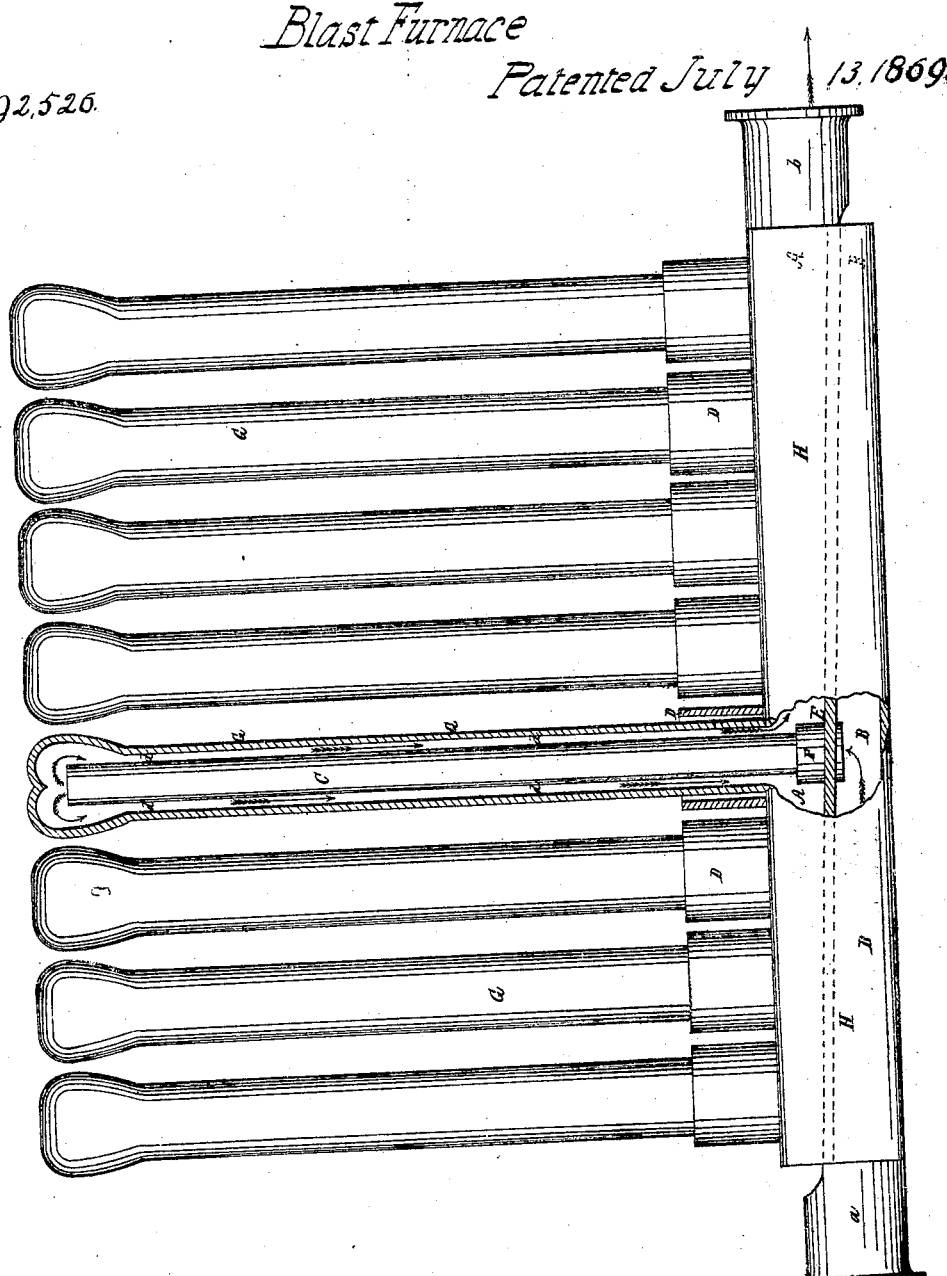

HOMER HAMILTON, OF YOUNGSTOWN, OHIO.

Letters Patent No. 92,526, dated July 13, 1869.

IMPROVED BLAST-HEATING FURNACE.

The Schedule referred to in these Letters Patent and making part of the same.

*To all whom it may concern:*

Be it known that I, HOMER HAMILTON, of Youngstown, in the county of Mahoning, and State of Ohio, have invented a new and improved Blast-Heating Apparatus; and I do hereby declare that the following is a full, clear, and exact description thereof, which will enable others skilled in the art to make and use the same, reference being had to the accompanying drawings, forming part of this specification, in which—

Figure 1 represents a front elevation, partly in section, of my improved blast-heater.

Figure 2 is a vertical transverse section of the same.

Similar letters of reference indicate corresponding parts.

This invention has for its object to construct a simple and effective device for heating the air that is carried to a blast-furnace; and consists in such an arrangement of pipes that the air will be, in thin sheets, exposed to heated surfaces, and that expansion and contraction of the pipes will not injure the apparatus. The device will therefore operate successfully, and will not readily get out of order.

H, in the drawing, represents a horizontal pipe or vessel, of suitable length, divided by means of a horizontal or inclined partition, E, into two chambers, A and B, of which the lower one, B, is open at one end, at $a$, and the upper one at the opposite end, at $b$, as indicated in fig. 1.

D D are collars, projecting from the top of the pipe H, at suitable distances apart, for the purpose of supporting the outer pipes G, which are closed at their upper ends, as shown.

The partition E is also perforated under each pipe G, and from it projects a small tube, C, into each one of the pipes G, as shown, each tube C being open at both ends, and not reaching quite to the upper end of the surrounding pipe G.

An annular channel, $d$, is thus arranged within each pipe G, and around each tube C.

The upper parts of the pipes G are enlarged and rounded, as shown, and depressed in the centre, for the purpose of facilitating the passage of air from the tubes C to the annular passage $d$, and to avoid friction.

The burning gases surround the pipes G and H, and heat their surfaces.

The air is forced into the lower compartment B, at $a$, and passes up in the tubes C; thence into the passage $d$, where it is, in thin sheets, exposed to the heated surfaces of the pipes G. It leaves the passages $d$ at their lower ends, and enters the upper compartment A of the pipe H, whence it escapes through the opening $b$, either into a blast-furnace or into another heating-apparatus of similar construction.

It must be understood that for an ordinary large blast-furnace, a series of eight or ten pipes, H, with uprights G, should be provided, in order to produce sufficient heating-surface.

The pipes all support themselves, and do not strain any supporting-frame or other machinery. They can therefore be heated to a greater degree than the other devices heretofore used.

Having thus described my invention,

I claim as new, and desire to secure by Letters Patent—

1. The air-heating apparatus, consisting of the divided base-pipe H, and of the upright pipes C and G, all arranged in such manner that the air will pass from one compartment of the base-pipe, through all the vertical pipes, into the other compartment of the base-pipe, substantially as herein shown and described.

2. Forming the rounded enlargement on the upper end of each pipe G, to prevent friction of the air, as specified.

3. So constructing an air-heating apparatus that the air is, in a thin sheet, exposed to the heated surface of a pipe, as specified, the said air surrounding the pipe or tube in which it was conducted to the upper end of the heated pipe, as set forth.

HOMER HAMILTON.

Witnesses:
    MORRIS ULLMAN,
    OWEN EWENS.